Sept. 21, 1926.
E. MAYER
1,600,348
ARRANGEMENT FOR AUTOMATIC REGULATION OF MOTOR OR GENERATOR FIELDS
Filed July 21, 1923
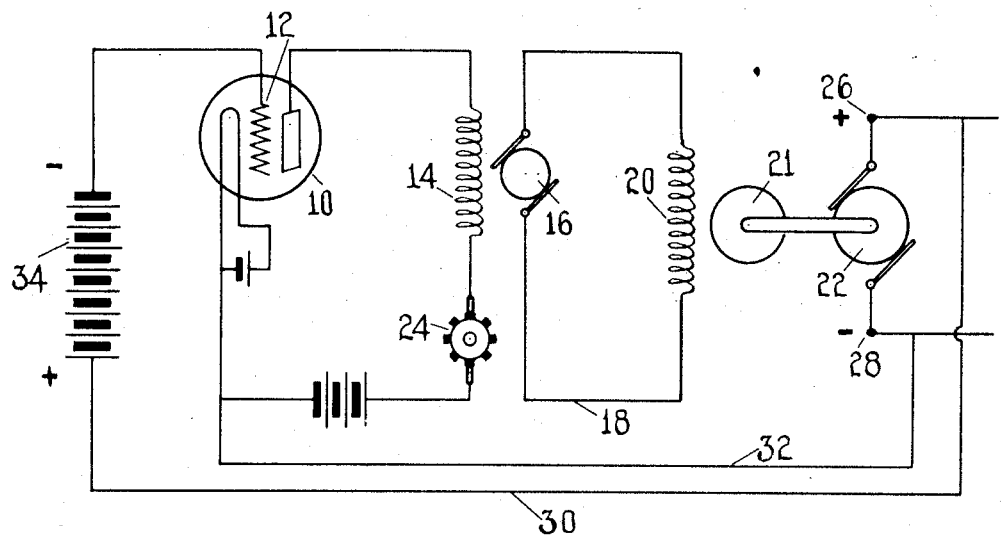
Inventor
EMIL MAYER
By his Attorney Patented Sept. 21, 1926.

1,600,348

UNITED STATES PATENT OFFICE.

EMIL MAYER, OF BERLIN, GERMANY.

ARRANGEMENT FOR AUTOMATIC REGULATION OF MOTOR OR GENERATOR FIELDS.

Application filed July 21, 1923, Serial No. 652,872, and in Germany August 3, 1922.

The present invention relates to an arrangement for automatic regulation of motor or generator fields wherein the speed of the motor or voltage of the generator is governed by means of a three-electrode vacuum tube. In case it is desired to maintain the speed of a motor constant, voltage from a driven generator which varies with motor speed is impressed on the grid of an electron discharge tube to vary the anode current. This anode current may flow through the field winding either of an auxiliary generator or of the motor to be regulated itself and is periodically interrupted several times a second for a purpose hereinafter described in detail.

In case it is desired to maintain the voltage of the generator constant, the above arrangement instead of operating on the field of the motor will operate on the field of the generator.

It has been repeatedly proposed to employ a vacuum tube or electron valve for automatic speed regulation of a motor or the voltage of a generator by adding the secondary current (anode-current) to the primary current. In a known arrangement, for instance, an electron valve controls the field of a small direct-current dynamo, the altered armature-voltage and armature-current of this machine being used for controlling the field of a larger motor or of a larger dynamo, that is, for regulating the speed, or the terminal-voltage of the larger motor or dynamo. It was found, however, that the speed and, consequently, the electric efficiency of a motor or dynamo could not be maintained constant by such an arrangement. Applicant's researches have shown that the reason therefor is, that the altering magnetization of the field to be controlled affects the iron in such a way that the values of magnetization upon increase and decrease of the magnetizing current, when plotted, do not lie on one line, but form a hysteretic loop.

This can be obviated by periodically altering the current supplied by the vacuum tube or valve, so that the circuit is opened and closed several times in a second. In this way the magnetization-curve may be made to lie on the middle line of the hysteretic loop.

The single figure of the drawing shows one arrangement according to the invention whereby the speed of a motor and driven generator may be maintained constant.

In the illustrated arrangement, a three-electrode vacuum tube 10 controlled by a grid 12 has a coil 14 connected in its anode circuit and constituting the field winding of a small direct current dynamo 16. The dynamo 16 supplies current to a circuit 18 which in turn includes a winding 20 in the field of a motor 21 which drives a larger generator 22. The positive and negative terminals 26 and 28 of the generator 22 are connected by conductors 30 and 32 to the cathode and grid respectively of the vacuum tube 10, and a battery 34 is interposed in the conductor 30 for causing the grid 12 to have a proper voltage while at the same time permitting the voltage of the grid to vary in accordance with changes in the voltage at the terminals 26 and 28 of the generator 22.

The anode circuit of the three-electrode vacuum tube 10 also contains an interrupter 24 which may be operated to open and close the anode circuit of the vacuum tube 10 several times per second. It is found that by the use of the described arrangement, a substantially uniform voltage may be maintained at the terminals 26 and 28 of the generator 22.

The interrupter 24 may also be inserted in the grid lead or replaced by a small alternating E. M. F. in that lead, for example of 500 periods per second.

It will easily be understood that the periodic variations in the current in the fielding winding 14 caused by the interrupter 24 cause similar periodic variations in the field winding 20.

The operation of the arrangement will be somewhat as follows: Suppose the motor 21 should speed up to a speed, greater than normal. The voltage between points 26 and 28 across generator 22 will be increased by the increase in speed and the grid of tube 10 will be made more positive. This causes an increase in the average current in the field winding 14 of auxiliary generator 16, which, in turn, causes the generated voltage of generator 16 to increase. This causes an increase in current thru the field 20 of driving motor 21 which slows down the motor.

All the while this governing action is taking place, the interrupter 24 is making and breaking the circuit including the field 14, thereby obviating the inaccuracy present in governing without the interrupter and due to the hysteresis loop, as pointed out above.

Having described my invention, what I claim is:

1. In combination, a dynamo electric machine having a field, first means responsive to a change from normal in operating condition of said machine, second means for causing the field strength to vary so as to eliminate hysteresis loop effect, and means coacting with said first and second means for restoring to normal the operating condition of said machine by changing the average strength of said field.

2. In combination, a dynamo electric machine, first means responsive to a change from normal in operating condition of said machine, second means comprising an exciter generator for varying the current in the field of said machine, and means coacting with said first and second means for restoring to normal the operating condition of said machine by changing the average strength of the current in said field.

3. An arrangement for automatically regulating the field strength of a dynamo electric machine, comprising a field winding for said machine, an auxiliary generator for supplying current to said field winding, a three-electrode vacuum tube having its anode circuit arranged in circuit with the field winding of the auxiliary generator, and an interrupter in the anode circuit of the tube for periodically opening and closing said circuit in order to cause the magnetization of the auxiliary generator to be altered in accordance with increase or decrease of the current in the anode circuit of the tube.

4. In combination, a main dynamo electric machine, an auxiliary direct current generator feeding the field of said main machine, an interrupter and a variable resistance in the field circuit of said auxiliary generator, means responsive to a change from normal in operating condition of said main machine for controlling said variable resistance.

5. In combination, a main dynamo electric machine, an auxiliary direct current generator feeding the field of said main machine, an interrupter and a three element electron discharge tube having the anode-cathode circuit thereof connected in the field circuit of said auxiliary generator, and means responsive to change from normal in operating condition in said main machine for controlling the potential of the grid of said tube.

6. In combination, a dynamo electric machine, a control circuit including an interrupter and a three element electron discharge tube having an anode-cathode circuit, means whereby said control circuit controls the field of said machine, and means responsive to change from normal in operating condition of said main machine for controlling the potential of the grid of said tube.

7. In combination, a driving motor, a generator driven by said motor, a three element electron discharge tube, a control circuit including an interrupter and the anode-cathode circuit of said three-element electron discharge tube, means whereby said control circuit controls the field of said machine, and a circuit connecting the output of said generator with the grid-cathode of said tube.

EMIL MAYER.